Dec. 23, 1952  M. A. YAKUBIK  2,622,680
FLOOR CUTTING HEATER AND METHOD
Filed Dec. 16, 1947  2 SHEETS—SHEET 1
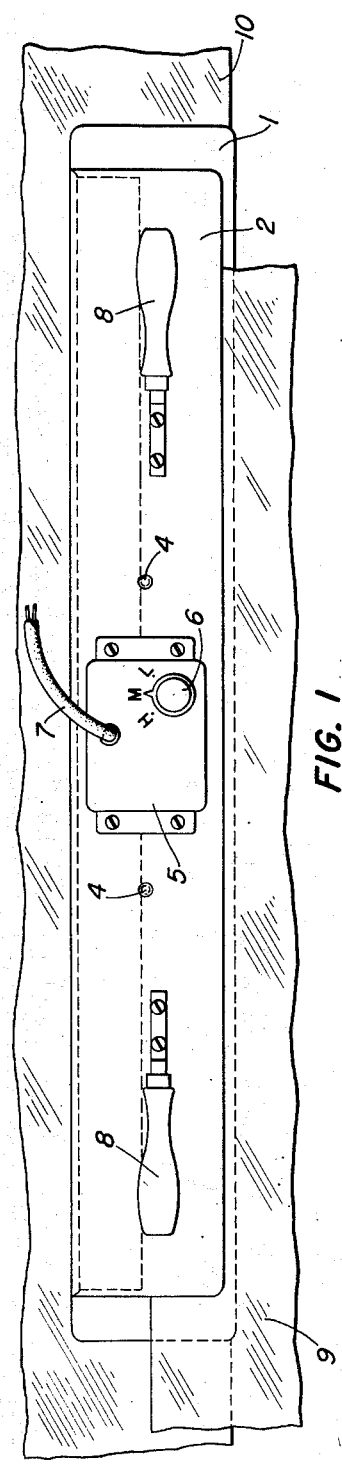
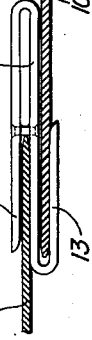
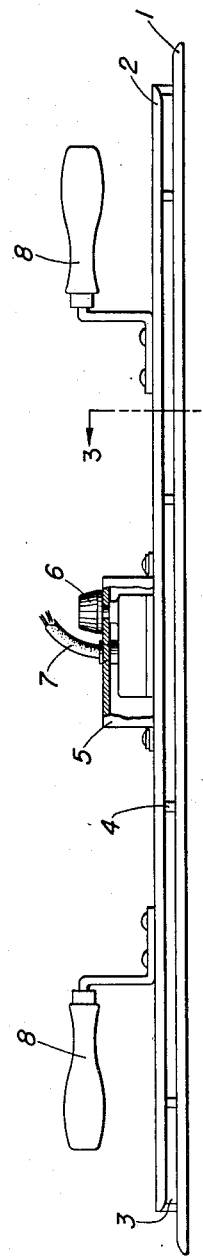
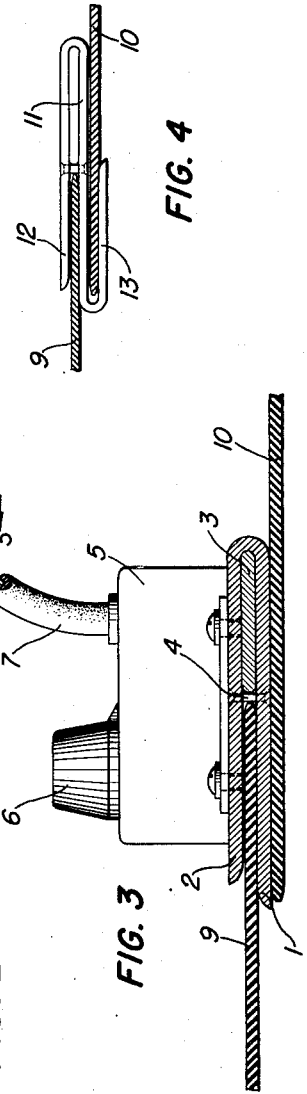
INVENTOR.
MICHAEL A. YAKUBIK
BY
ATTORNEY Dec. 23, 1952 M. A. YAKUBIK 2,622,680
FLOOR CUTTING HEATER AND METHOD
Filed Dec. 16, 1947 2 SHEETS—SHEET 2
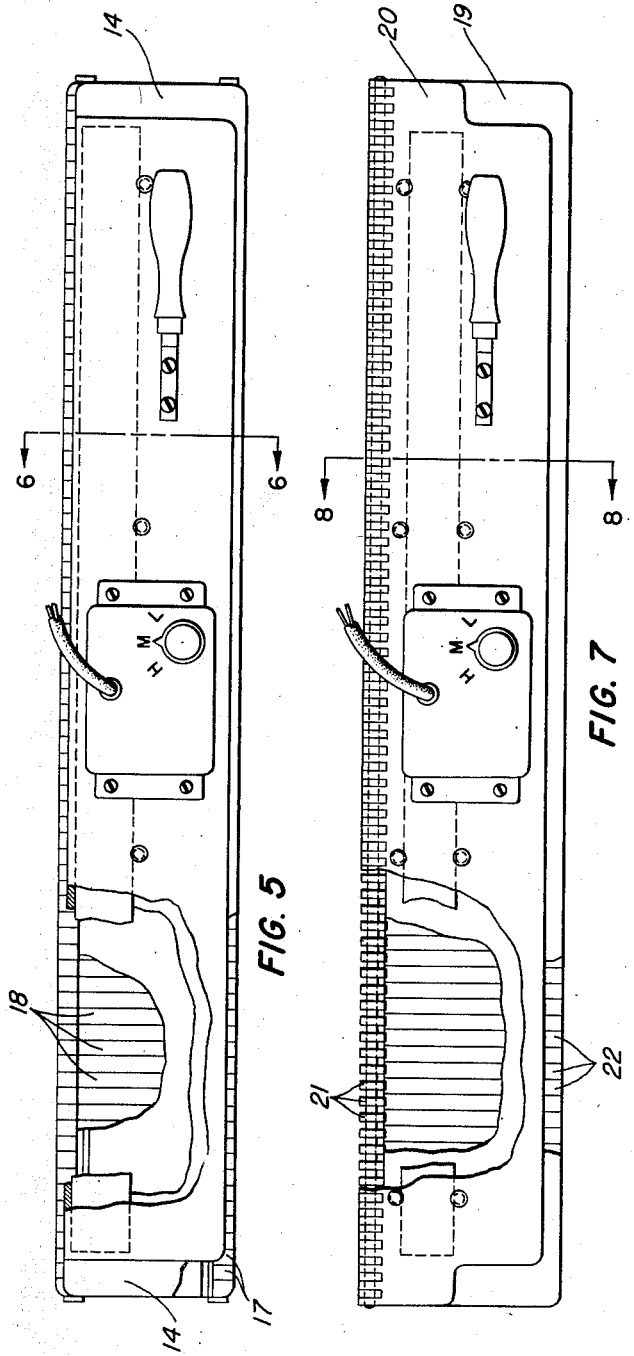
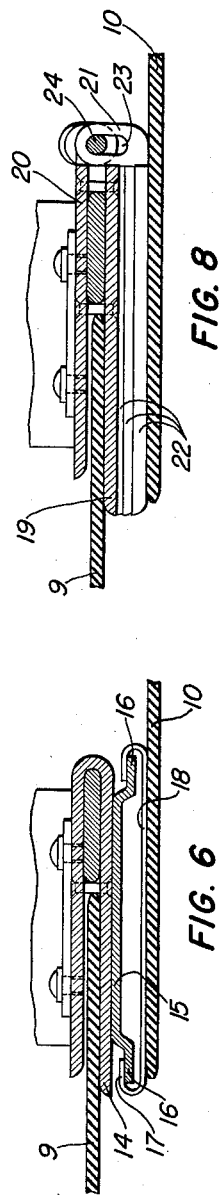
INVENTOR.
MICHAEL A. YAKUBIK
BY
ATTORNEY Patented Dec. 23, 1952

2,622,680

UNITED STATES PATENT OFFICE 2,622,680

FLOOR CUTTING HEATER AND METHOD

Michael A. Yakubik, Hudson, Ohio, assignor to Wingfoot Corporation, Akron, Ohio, a corporation of Delaware Application December 16, 1947, Serial No. 791,945

14 Claims. (Cl. 164—17)

The present invention relates to a sheet flooring heating device for heating overlapping layers of flooring, particularly rubber flooring, linoleum and plastic or synthetic rubber flooring. This heating of the layers facilitates the cutting or trimming of the layers. It will be understood that the word "flooring" may include other materials than those listed which are favorably affected by the heating to facilitate the cutting thereof. Thus, unless otherwise specified, the claims are not intended to be limiting as to the material being acted upon. For example, my invention is equally applicable to material of the above character which may be applied to walls or the ceiling of a room or in the decoration of counters, tables, etc.

Since the main objective of this invention is to provide a heating element which will facilitate cutting, it is important that the heating be done in a manner to give the most effective heating in the shortest period of time. For this reason, my invention contemplates heating overlapping layers of flooring by introducing a heated element opposite each surface to be heated rather than let the heat penetrate from one layer through to the next.

Another object of this invention is to provide an improved method of cutting flooring which will facilitate the laying of such flooring.

Other objects of this invention will appear hereafter as the description thereof proceeds, the novel arrangements, features and combinations being clearly set forth in the specification and in the claims thereunto appended.

In the drawings:

Fig. 1 is a plan view of a device embodying my invention and showing its application to overlapping layers of flooring material;

Fig. 2 is a front elevation of the device;

Fig. 3 is a cross section taken along the line 3—3 of Fig. 2 but additionally showing the overlapping edges of flooring;

Fig. 4 is a fragmentary cross section of a modification of the invention shown in Figs. 1, 2 and 3;

Fig. 5 is a plan view of a modification form of my invention;

Fig. 6 is a cross section taken substantially along the line 6—6 of Fig. 5; and

Figs. 7 and 8 are views similar to 5 and 6, respectively, of a still further modification of my invention with Fig. 8 being a cross section taken along the line 8—8 of Fig. 7.

It is common practice in the laying of rubber and other flooring of a like material, to cause adjacent strips of rubber to overlap a few inches and then run a sharp knife through both layered marginal portions simultaneously or at least along the same line on successive cuts to make the adjacent edges of the strips join each other along a line which, while not necessarily straight, will be such that the joint between the strips is substantially unnoticed.

When the material is cold, a considerable effort must be employed to cut two or more layers simultaneously and with certain types of flooring of the character described, it is often impossible to cut both layers with a single cut, thus making it necessary to make repeated cuts through the material with the result that the joint between the adjacent edges eventually may not be as uniform as where a single cut can be employed.

It is therefore a purpose of my invention to heat the flooring to condition it for easy cutting and not merely by applying a heated element to the upper of two adjacent layers but to supply the heat simultaneously to both layers and in such a manner that the cutting operation will be greatly facilitated. I have also provided a very compact, economical and efficient device for carrying out the method of my invention and have shown several embodiments of my invention.

In Figs. 1, 2 and 3, the reference numeral 1 represents a lower heated member and 2 the upper heated member held in spaced relation from each other by means of an interposed plate 3 which gives the proper spacing between the plates. Rivets 4 draw the members 1 and 2 against plate 3 so that the members 1 and 2 are held in fixed, spaced relation with respect to each other. While I have shown the members 1 and 2 formed of one piece (see Fig. 3) it will be recognized that the two members may be separate and held in spaced relation in any suitable manner by rivets, welding or any suitable fastening means.

Superimposed upon the member 2 is a heating unit 5 of any desired construction having a thermostat control 6, if desired, with an electric cord 7 adapted to be connected to any suitable source of electric current. No particular claim is laid to the heating element employed and it is conceivable that some other form of heating can be used other than the electricity, as for example, gas heating. The essential part of the invention is that some heating means be provided to heat the members 1 and 2.

The handles 8 are used for manipulating the device as desired.

In Fig. 3, I have shown my device as applied to overlapping marginal portions of adjacent strips of flooring, the edge of the one strip which I will refer to as the upper strip 9, is inserted in the space between the members 1 and 2 while the member 1 rests directly on the strip 10, thus both sides of the upper strip 9 and the upper side of the lower strip 10 are directly heated by the members 1 and 2.

In Fig. 4, I have shown a modification of the device shown in Fig. 2 in which I have provided three superimposed members spaced from each other comprising the members 11 and 12, which correspond to members 1 and 2 of Fig. 3 but in which there is an extension 13 on the member 11, which is turned backwardly under the member 11 in spaced relation thereto to engage the under side of the strip 10. In this form of the invention, the upper and lower sides of each strip are simultaneously subjected to the action of the heating elements and the heat penetrates the material of the strips simultaneously from opposite sides, thus shortening the length of time necessary for conditioning the flooring for cutting.

While the device shown in Fig. 4 may be employed for particularly difficult conditions, the device shown in Figs. 1, 2 and 3 is satisfactory for most conditions and will give the desired amount of heat to soften up the material for cutting. It will be noted from an inspection of Figs. 1 and 2, especially, that the upper member 2 is not coextensive with the member 1 and extends at each end and at one side (the open side between the members) somewhat short of the vertical planes through the corresponding edges of the member 1. This facilitates the insertion of the margin of flooring strip 9 and to further facilitate this entry, it will be noted in Figs. 2 and 3 that the lower, free edges of the upper member are somewhat rounded off; also, the upper, free edges of the lower member.

In practice, the device is applied, as shown in Figs. 1 and 3 particularly, to the overlapping margins of adjacent strips of flooring at the point where the first cut is to be taken. The heat is applied to the members 1 and 2 by the heating element 5 and when the flooring has been heated the proper amount, the device is slid longitudinally of the edges to heat successive portions of the layered margins while the cut is being taken through the heated portion of the material. Thus, the operator first heats and then cuts sections of the overlapping edges and repeats this operation until the desired length of cut has been made.

In Figs. 5 and 6, I have shown a modification of the invention in which the lower member 14 corresponds in general to the member 1 but additionally has a plate 15 attached to the under side thereof with laterally extending lips 16 spaced from the member 14 to provide a recess adapted to loosely receive the inturned edges 17 on plates 18, which plates, as shown in Fig. 5, are relatively narrow in a direction longitudinally of the device and are independently movable with respect to each other. By having a series of plates independently movable in a vertical direction and constituting a heating element for the strip 10, it is possible to have more intimate contact between the heating element and the flooring where the floor is irregular and the flooring lays uneven thereon, as is sometimes the case. If the lower member were perfectly flat as in Figs. 1, 2 and 3, the heating element would not come into intimate contact with the flooring. In case it is found that the transmission of heat from the plate 15 to the loosely mounted plates 18 is insufficient to conduct a proper flow of the heat to the plates 18, the inturned edges 17 may be formed so as to be connected by light springs which may in turn be permanently connected to the plate 15 or to the under side of the member 14.

In Figs. 7 and 8, I have shown a still further modification of my invention in which the lower member 19 corresponds to member 14 of Figs. 5 and 6 and 1 of Figs. 1, 2 and 3 and in which the member 20 corresponds to member 2 in Figs. 1, 2 and 3. In this form of the invention, the members 19 and 20 are formed of one piece of material and the U-shaped portion connecting the two members is notched out to receive the upwardly extended lugs 21 on a series of longitudinally adjoining separate small plates 22, each lug having a slot 23 therein through which the pin 24 extends. Each of the plates 22 is supported on the pin 24 and the pin, in turn, is rigidly secured to the connecting portion between the members 19 and 20. In order to prevent any appreciable pivotal action of the plates 22, it will be noted that one side of each of the lugs 23 abuts against a vertical surface on the members 19 and 20 so that the plates can have vertical movement but little, if any, pivotal movement. In practice, of course, there is sufficient clearance between the lugs 21 and the members 19 and 20 to provide free vertical action of the plates 22.

Obviously, various changes can be made in the particular arrangement and construction of the parts shown without departing from the spirit of this invention and therefore I do not wish to be limited except as set forth in the specification and in the claims hereunto appended.

Having thus fully described my invention, what I claim and desire to secure by Letters Patent of the United States is:

1. The method of cutting overlapping edges of flooring which comprises the steps of interposing a flat heated element of substantial area between the overlapping edges to heat said edges and thereafter simultaneously cutting the overlapping edges, while the layers are still heated.

2. The method of cutting overlapping layers of flooring comprising the steps of simultaneously heating each layer by superimposing flat heated surfaces of substantial area in direct heating engagement with each layer and thereafter simultaneously cutting both layers, while the layers are still heated.

3. The method of cutting overlapping layers of flooring comprising the steps of simultaneously interposing a flat heated element of substantial area between the layers and also a similar heated element over one of said layers on the side opposite said first heated element, and thereafter simultaneously cutting said layers while heated.

4. The method of cutting overlapping layers of flooring which comprises the steps of introducing a flat heated element of substantial area between adjacent opposed sides of said layers and a similar heated element adjacent the non-opposed sides of each of said layers and thereafter simultaneously cutting the heated layers.

5. A heating device for heating layered marginal portions of sheet flooring laid with overlapping edges for the purpose of facilitating cutting of the layered marginal portions, comprising an elongated thin flat lower heating member, an elongated upper heating member in shallow spaced parallel relation above and connected to said lower heating member, said lower and upper heating members having opposing flat heating faces of substantial areas adapted to heat the opposite faces of the upper one of flat layered marginal portions of sheet flooring and said lower heating member also having a lower flat heating face of substantial area adapted to heat the upper face of the lower one of flat layered marginal portions of sheet flooring, and means for heating said heating members secured to one of the heating members.

6. A heating device for heating layered marginal portions of sheet flooring laid with overlapping edges for the purpose of facilitating cutting of the layered marginal portions, comprising an elongated thin flat lower heating member, an elongated upper heating member in shallow spaced parallel relation above and connected to said lower heating member, said lower and upper heating members having opposing flat heating faces of substantial areas adapted to heat the opposite faces of the upper one of flat layered marginal portions of sheet flooring and said lower heating member also having a lower flat heating face of substantial area adapted to heat the upper face of the lower one of flat layered marginal portions of sheet flooring, and means for heating said heating members, secured to one of said members, said lower heating member having a free longitudinal edge projecting laterally outward beyond the corresponding longitudinal edge of said upper heating member.

7. A heating device as set forth in claim 6 in which the heating members are connected together along their outer longitudinal edges.

8. A heating device as set forth in claim 6 in which the lower heating member also has free opposite ends projecting longitudinally outward beyond the ends of the upper heating member.

9. A heating device for heating layered marginal portions of sheet flooring laid with overlapping edges for the purpose of facilitating cutting of the layered marginal portions, comprising three elongated thin flat heating members superimposed in shallow spaced parallel relation, the intermediate of said heating members being adapted to be inserted between opposing faces of flat layered marginal portions of sheet flooring and having opposite flat heating faces of substantial area for heating the opposing faces of flat layered marginal portions of sheet flooring, the other heating members being connected to said intermediate heating member along opposite longitudinal edges thereof and having flat heating faces of substantial area adapted, respectively, to be adjacent the upper face of the upper one of the flat layered marginal portions of sheet flooring and the lower face of the lower of the flat layered marginal portions of sheet flooring for heating the same, and means for heating said heating members secured to one of said members.

10. A heating device for heating a margin of sheet flooring for the purpose of facilitating cutting of the layered marginal portions, comprising at least in part an elongated plate of U-shaped cross-section having shallowly spaced parallel flat opposing faces of substantial area for closely embracing and heating a margin of sheet flooring, and means for heating said plate secured thereto, one leg of said plate having a free longitudinal edge projecting laterally outwardly beyond the corresponding longitudinal edge of the other leg of said plate.

11. A heating device as set forth in claim 5 in which the lower heating member comprises a series of separate longitudinally adjoining heating face forming flat sections mounted for independent vertical movement.

12. A heating device as set forth in claim 5 in which the lower heating member comprises a rigid flat plate forming the upper heating face of said lower heating member and a series of separate longitudinally adjoining flat sections mounted by and below said plate for vertical movement independently of said plate and of each other and forming the lower heating face of said lower heating member.

13. A heating device as set forth in claim 5 in which the lower heating member includes a rigid flat plate forming the upper heating face of said lower heating member, a series of separate longitudinally adjoining flat sections below said plate and forming the lower heating face of said lower heating member, and pin and slot connecting means connecting said series of sections to said plate for vertical movement independently of the plate and of each other.

14. A heating device as set forth in claim 13 further including means for guiding the series of separate sections for vertical movement and against pivoted movement.

MICHAEL A. YAKUBIK.

REFERENCES CITED

The following references are of record in the file of this patent:

UNITED STATES PATENTS

| Number | Name | Date |
|---|---|---|
| 1,095,925 | Pogue | May 5, 1914 |
| 1,933,287 | Vita | Oct. 31, 1933 |
| 1,999,856 | Austin | Apr. 30, 1935 |
| 2,084,625 | Stebbins et al. | June 22, 1937 |
| 2,122,936 | Franzmann | July 5, 1938 |
| 2,232,640 | Schwartzman | Feb. 18, 1941 |
| 2,256,506 | Wagner | Sept. 23, 1941 |
| 2,368,445 | Brandt | Jan. 30, 1945 |
| 2,372,929 | Blessing | Apr. 3, 1945 |
| 2,420,284 | Carswell | May 6, 1947 |
| 2,500,895 | Davies | Mar. 14, 1950 |
| 2,535,029 | Atanasoff et al. | Dec. 26, 1950 |